Jan. 21, 1964  A. HOSHIZAKI  3,118,683
PRECISION ARBOR
Filed Dec. 4, 1961  2 Sheets-Sheet 1

INVENTOR.
Akira Hoshizaki
BY
ATT'Y.

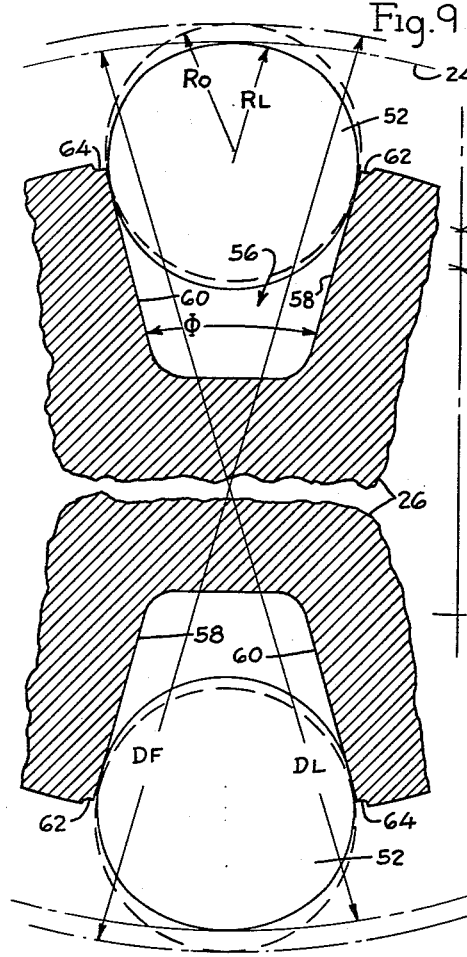
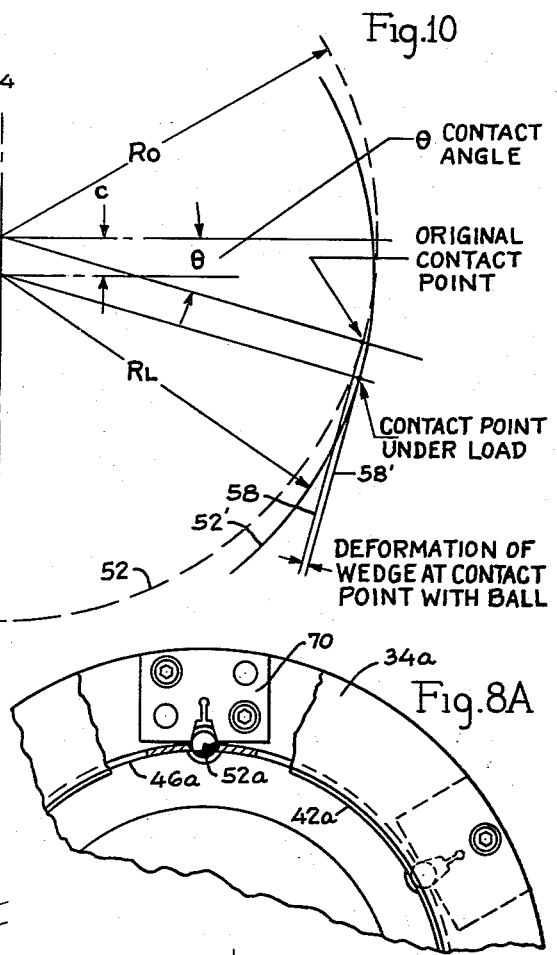
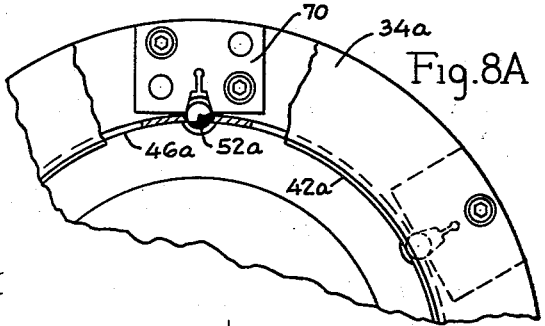
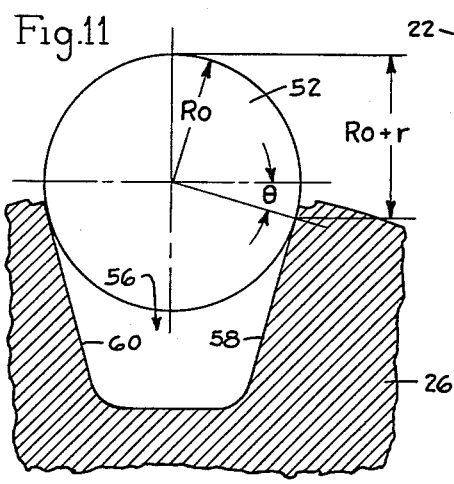
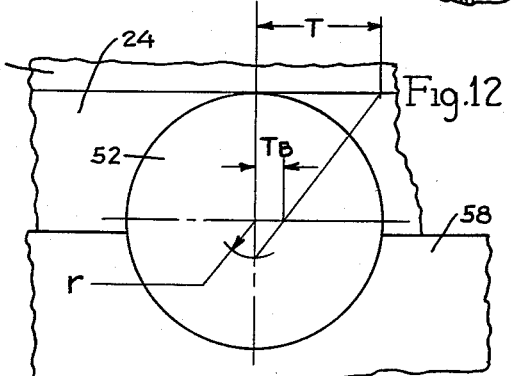

United States Patent Office 3,118,683
Patented Jan. 21, 1964

3,118,683
PRECISION ARBOR
Akira Hoshizaki, Morton Grove, Ill., assignor to Illinois Tool Works Inc., Chicago, Ill., a corporation of Delaware
Filed Dec. 4, 1961, Ser. No. 156,848
12 Claims. (Cl. 279—2)

This invention relates in general to precision arbors and more particularly relates to precision arbors of the interference fit type of workholding devices.

Workpieces which must be supported or held in an accurate manner for subsequent manufacturing operation or for inspection present a problem not uncommon in industry. For example, where workpieces are to be supported or located relative to an internal diameter or outer diameter, which has its own manufacturing tolerance (examples being gears, rings, etc.). Elaborate devices have often been used heretofore with varying degrees of precision. Examples of prior art workholding devices are air or hydraulic operated arbors which are quite elaborate in construction and cumbersome in operation and in amount of space required for containing the working parts thereof. There are many instances in manufacturing and inspection, where simple push-on arbors are advantageous, due to ease of operation, minimal amount of space required for the arbor, and economy of working parts. However, prior art push-on arbors, have suffered from lack of precision and in many instances require excessive force to assemble the workpiece and the arbor so that wear or damage to both the arbor and the workpiece becomes a major problem.

It is a general object of this invention to provide an interference fit workholding device of high precision and great simplicity.

It is a further object of this invention to provide a precision arbor which assembles to a workpiece by a straight "push-on" action requiring no subsequent expansion thereof.

It is a further object of this invention to provide a precision work arbor which may be adapted for most any shape of work surface to be supported, provides a balanced holding force between opposite contact points, is self-adapting to the workpiece and compensates for inaccuracies in the workpiece holding surface.

Another object of this invention is to provide an economical arbor utilizing precision balls which are commercially available at low cost which roll against the complementary surface of the workpiece in a manner such that brinelling, marring or scratching of the finished supporting surface of the workpiece is minimized.

The novel features that are characteristic of this invention are set forth with particularity in the appended claims. The invention itself, however, both as to its organization and its method of operation, together with additional objects and advantages thereof will best be understood by the following description of specific embodiments when read in connection with the accompanying drawings in which:

Figure 2:
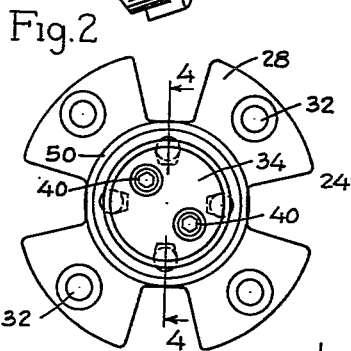
FIG. 2 is a right hand end view of the arbor shown in FIG. 1.
Figures 4, 6:
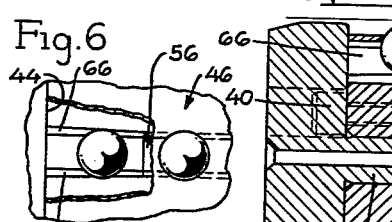
Figure 5:
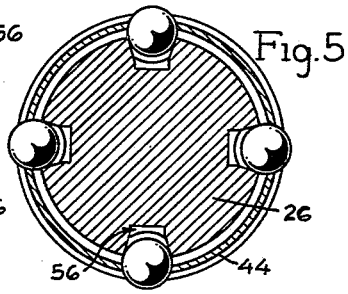
Figures 7, 8:
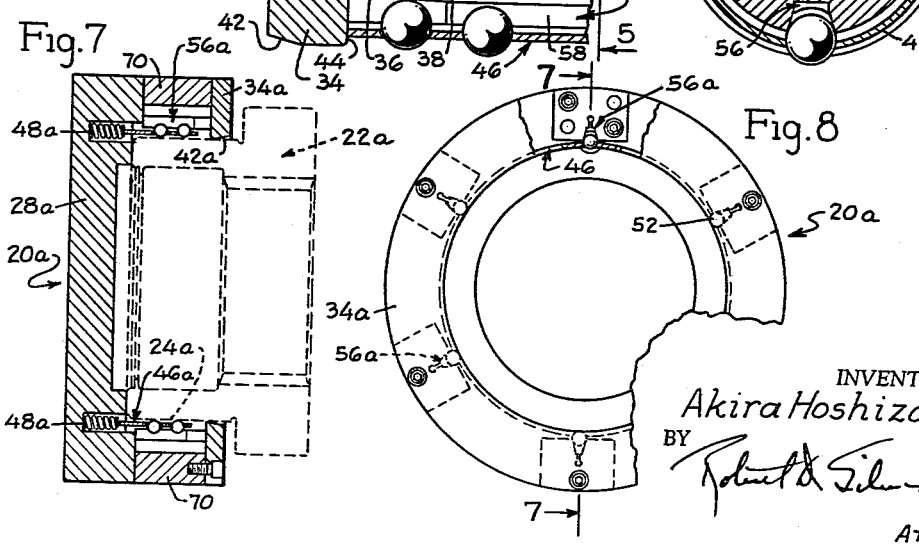

FIG. 4 is a sectional view along lines 4—4 of FIG. 2;
FIG. 5 is a sectional view along lines 5—5 of FIG. 4;
FIG. 6 is a fragmentary view along lines 6—6 of FIG. 4 with portions being broken away to illustrate the construction;
FIG. 7 is a sectional view illustrating another form of my invention, the workpiece being shown in dotted lines, the view being taken along lines 7—7 of FIG. 8;
FIG. 8 is a right hand end view of the embodiment of the arbor shown in FIG. 7;
FIG. 8A is an enlarged fragmentary view, partially in section, illustrating the working parts of the arbor shown in FIGS. 7 and 8;
FIG. 9 is an enlarged semidiagrammatic view illustrating the principles of my invention;
FIG. 10 is a semidiagrammatic view showing some of the geometric and mathematical relationships of my arbor; and
FIGS. 11 and 12 are semidiagrammatic views illustrating other mathematical and geometric principles relating to my invention.

The arbor 20 is adapted to interferingly fit within a workpiece 22 here shown in the form of a gear. Workpiece 22 here shown as a gear has a cylindrical bore surface of a predetermined diameter.

The arbor 20 has a body portion 26 which has an axis which is adapted to be aligned with the axis of the bore 24 of the workpiece. The body portion 26 of the arbor is preferably made of tool steel. One end of the body 26 is formed with an attaching plate-like flange 28, there being a central extension 30 and mounting holes 32 therein so that the arbor may be mounted on a suitable face plate. The other end of the body 26 has a nose piece 34 having a central extension 36 which fits into a central bore 38 in the body 26 and is fastened to the end of the body by suitable fasteners 40. The leading end of the nose piece 34 is preferably beveled as shown in 42 and the diameter is preferably slightly larger than that of the body 26 to define an annular shoulder 44 for purposes hereinafter appearing.

A ball retaining cylindrical collar 46 is disposed in spaced surrounding relationship to the body 26 and is biased against shoulder 44 of the nose piece by a spring 48. One end of the spring engages the ball retaining collar 46 and the other end engages a spring retaining collar member 50 which is surroundingly disposed to the body 26 and which in turn bottoms on the face flange 28.

Figure 1:
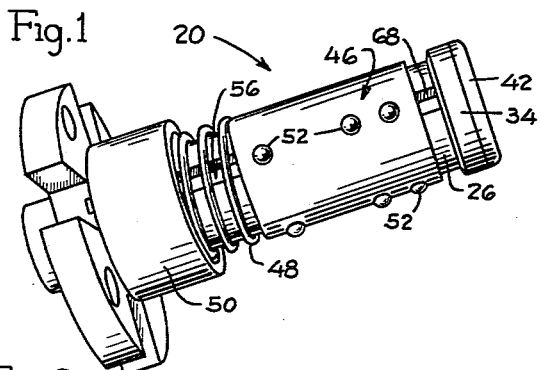
FIG. 1 is a perspective view of one form of my precision arbor, the spring and ball retaining collar being moved from their "at rest" position to expose the parts for purposes of clarity.
Figure 1B:
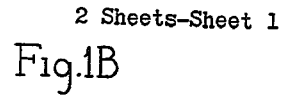
FIG. 1B is a fragmentary sectional view of a portion of FIG. 1A.
Figure 1A:
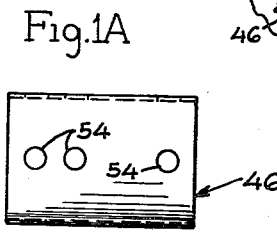
FIG. 1A is a plan view of the ball retaining collar which forms a part of the assembly shown in FIG. 1.

Spherical members 52 in the form of a plurality of high precision steel balls of the types found in bearings are disposed in apertures 54 in the ball retaining collar 46. The apertures 54 have a diameter which is slightly smaller than the diameter of the spherical balls 52 as shown in FIG. 1B. The diameter of the collar 46 is such that when the balls 52 are placed in the apertures 54, the collar will be maintained in spaced relation to to the body 26, the outer diameter of collar 46 being slightly less than the outer diameter of the nose portion 34 at its greatest radial extent. The balls 52 are adapted to roll in a plurality of axial grooves 56, four such grooves being shown for illustration purposes in the first embodiment of the invention. The relationship of the diameter of the balls 52 and the geometry of the grooves 56 will be more readily understood with reference to FIGS. 9 through 12.

The individual grooves 56 are parallel to the axis of body 26 and, as shown in FIG. 9, have inclined side walls 58 and 60 which are angularly disposed to each other at a predetermined angle $\phi$, and which are spaced apart a lesser predetermined distance near the inboard edges of the side walls than at the side wall outboard edges. Where the side walls 58 and 60 join the outer circumference of the body 26 small fillets 62 and 64 may be made in the body for purposes of maintaining accuracy and to eliminate burrs. As shown in FIG. 9, the balls 52 when disposed in two opposed grooves on the body 26 have an original or free state arbor diameter designated $D_F$. $D_F$ is the diameter of the arbor as measured from the furthest extending portions of two balls on opposite sides of the arbor, when the arbor is not in interfering fit relationship with a workpiece. The angle $\phi$ is always greater than the locking angle for V-shaped grooves and $\phi$ is equal to $2\theta$, $\theta$ being the contact angle of the ball 52 with a side wall as shown in FIG. 10.

When a workpiece is inserted over the arbor, the workpiece having a diameter equal to $D_L$ as shown in FIG. 9, balls 52 deform from round to the somewhat oblated shape shown in FIG. 9. The overall diameter of the arbor, as measured between the two furthest most opposing portions of the balls 52 on opposite sides of the arbor, also obtains a dimension designated as $D_L$, i.e., the same dimension as the inside bore 24 of the workpiece 22. The balls 52 have an original or free state radius $R_O$ and under load deformation have a radius $R_L$, the difference therebetween when multiplied by 2, being the amount of contraction of the diameter of the arbor under load which provides the interfering fit. It will be realized that $R_O$ is always greater than $R_L$.

Figure 3:
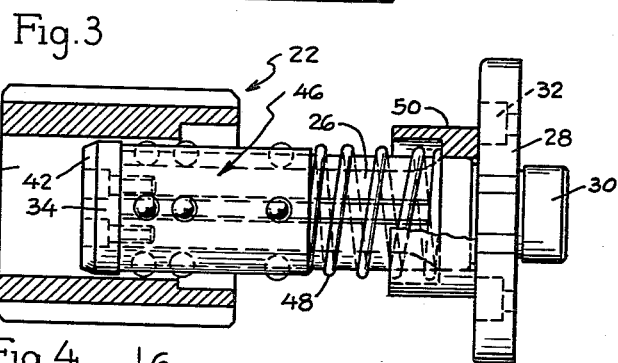
FIG. 3 is a plan view, partially in section, of the work arbor shown in FIGS. 1 and 2 as it is being assembled to a workpiece.

The deformation of the balls 52 caused by interfering contact with the bore 24 in turn causes a deformation of the side wall 58 as shown in FIG. 10. (While there is also some deformation in the surface 24 of the workpiece, this will vary depending upon the hardness of the workpiece, nature of the surface of the workpiece, and nature of any deviations from a true surface caused by manufacturing tolerances.) The balls 52 when deformed to position 52' under load move radially inwardly to body 26 a dimension "c" which changes the original contact point with the side walls 58 and 60 of the groove toward a lower point on the groove wall designated in FIG. 10 as the contact point under load. This in turn caused the side wall 58 to move slightly to the right as viewed in FIG. 10 to the position designated 58'. It will be realized that the geometry must be designed within the elastic limits of the material used. Thus, when a workpiece is inserted over the arbor 20, contraction takes place at three points to provide an interference fit, namely, the point of contact of ball 52 with the workpiece and the two points of contact of the ball 52 with the sides 58 and 60 of the groove 56. There is a wedge-like action between the balls 52 and the sides 58–60 of the grooves upon deformation, however, as long as angle $\phi$ is at non-locking angle for a V-groove, the ball 52 will return to its original radially outward position due to the resiliency of the material of the body 26 and the material of the ball 52 upon removal of the workpiece from the arbor. Further, due to the axial spacing of the balls 52 one from the other in each groove, as shown in FIGS. 1 and 3, the individual balls 52 will each seek (within the elastic limits of the materials and, assuming, predetermined tolerance ranges) its own radial location relative to the bore surface 24 of the workpiece so as to take care of problems of tapered, bellmouthed, and barrel-shaped holes 24 in the workpiece. Each circumferential row of balls contracts to suit its own complementary cross section of workpiece and since the individual balls 52 operate independently of each other, they are not limited to working on the smallest cross section of the bore 24. It is to be realized that this is a high precision arbor and tolerances of the bores 24 in the workpiece are measured in terms of a few thousandths to one ten-thousandth of an inch. Since each ball finds its own seat, there is no induced cocking of the workpiece to the arbor center line.

It will be apparent that the number of V-grooves 56 and the number of corresponding circumferential and axial rows of balls 52 can be varied to suit various applications. More balls 52 and grooves 56 are advisable when a greater amount of relative torque is to be withstood by the workpiece and arbor. Further, it will be appreciated that the wedge and balls principle arbor as above-discussed is not limited to an arbor for the particular cylindrical type of surface of workpiece shown. More particularly, it is possible to change the shape of the arbor to correspond with the work surface to be engaged and rectilinear arbors as well as various other geometrical and complex shaped arbors are adaptable for use of the balls and wedge principles above-discussed.

Another important aspect to the construction shown, is the fact that the individual balls 52 roll both on the workpiece surface 24 as well as relative to the groove side walls 58 and 60. This produces longer life of the arbor, less wear on the arbor, and minimizes brinelling, marring, or scratching of the finished bore of the workpiece. Further, a very small amount of linear overtravel of the workpiece relative to the body is required as is shown by FIGS. 11 and 12. By proper design the linear travel of the balls 52 can be controlled and minimized and thereby the arbor length can be made to suit. For purposes of explaining this principle, we will use the radius $R_O$ as the radius of the balls 52 during the travel (although there will be small changes from the theoretical due to the small variations in the size of the bore 24 of the workpiece which will change this radius of the ball to $R_L$.) As viewed in FIGS. 11 and 12 $R_O$ equals the radius of the ball, $r$ equals the rolling radius of the ball on the side walls of the V-groove, T equals the travel of the workpiece 22 on the ball outer diameter and relative to body 26, $T_B$ equals the travel of the ball 52 relative to body 26, and $\theta$ equals the ball and the V-groove side wall contact angle. It is desired that $\theta$ be chosen for optimum design. It will be seen that the rolling radius of the ball on the V-groove 58 is equal to $R_O \sin \theta$ and the following mathematical relationships obtain:

(1) $$\frac{T}{R_O+r} = \frac{T_B}{r}$$

(2) $$T_B = \frac{Tr}{R_O+r} = \frac{T R_O \sin \theta}{R_O + R_O \sin \theta}$$

(3) $$T_B = \frac{T \sin \theta}{1+\sin \theta} = \frac{T}{1+\frac{1}{\sin \theta}}$$

(4) $$T_B = \frac{T}{1+\csc \theta}$$

As can be intuitively perceived from FIG. 12, the workpiece 24 will travel on the O.D. of the ball 52 and as long as the ball 52 rolls on two points on the side walls 58 and 60, the arbor will travel relative to the workpiece a greater distance than the ball 52 will move relative to the groove 56. In the last analysis, the locking angle $\theta$ for V-grooves, is the limiting factor preventing zero travel of the ball relative to the groove.

To enhance loading of the workpiece on the arbor, it has been found desirable to deepen the groove side walls at 66 and 68, maintaining the same relative angles therebetween. This is done for a short area adjacent to the nose piece 34 as shown at 66 and 68 (in FIGS. 4 and 6). Thus, the first circumferential row of balls immediately adjacent to the nose are depressed slightly relative to the second and third axially spaced rows of balls. As the arbor enters the workpiece, the workpiece contacts the second row of balls 52 which are forced into rolling contact with surface 24 of the workpiece. Continual relative assembly motion of the arbor and the workpiece causes the collar to move against spring 48 causing the first roll of balls to come up into engagement with the surface 24. Thus, the first roll of balls rises out of its chamfered portion of the grooves and contacts the bore of the workpiece. At this point, the combination of rolling and linear motion of the ball and collar as a unit permits the workpiece to be pressed onto the arbor with a minimum of force and hold it with an interference fit required for great precision and accuracy.

A second work arbor 20a is shown in FIGS. 7, 8 and 8A. This work arbor is sometimes called a "pot type" arbor and utilizes essentially the same principles as does the male arbor shown in FIG. 1 through FIG. 6. Similar parts are identified with similar reference numerals with the addition of the suffix "a." In essence the arbor 20a is designed to fit on an O.D. surface of a workpiece 22a. For convenience of manufacturing, it is possible to have an equivalent to the body 26 by mounting inserts 70 containing the grooves 56a to a nose portion 34a and a base plate 28a. The other relationships are identical to those aforediscussed except for the changes required by contacting the outer diameter rather than the inner diameter. The springs 48a may be a plurality of small springs rather than a single large spring as shown in FIG. 3. In operation the same relative relationships obtain as aforediscussed.

From the foregoing it is seen that I have shown an arbor utilizing a rolling ball and wedge principle which makes an interference fit contact with the workpiece surface utilizing the resiliency of the balls and the resiliency of the material of the arbor for returning to the same initial position after contacting a workpiece. There is a contraction for interference fit which takes place on three points of contact on the individual ball and two points of contact on the groove in the arbor. The action of the wedge and resiliency of the ball 52 allows for variation in the work bore size. The use of a nonlocking angle of the essentially V-shaped grooves insures original size when the workpiece is unloaded from the arbor. The linear travel and rolling principle of the ball unit permits ease of loading. The contact angle of the V-groove with the ball determines the length of the linear travel and hence the length of the arbor can be controlled within predetermined limits. The arbor is simple to operate, requires no twisting or expanding or supplementary operation to cause a good tight interfit with the workpiece which gives greater accuracy and versatility than heretofore known arbors. It is possible, within limits, to change the size of the balls 52 to accommodate different sizes of workpiece surfaces. This effectively changes the arbor size. It is further to be understood that when there are very high torque applications, the workpiece may be clamped to face plate 28 by any suitable means (not shown).

Although specific embodiments have been shown and described, it is with full awareness that many modifications thereof are possible. The invention, therefore, is not to be restricted except insofar as is necessitated as by the prior art and by the spirit of the appended claims.

What is claimed as the invention is:

1. A high precision arbor for workpieces having an arbor engageable surface comprising body means having a longitudinal axis adapted to be aligned with the longitudinal axis of the arbor engageable surface of the workpiece, a plurality of spaced parallel grooves formed in said body means parallel with the longitudinal axis of said body means, each of said grooves having side walls spaced apart a predetermined distance, a plurality of spherical work engageable members each having a diameter greater than said predetermined distance having at least portions thereof disposed in said grooves for movement only in direction parallel with the axis of said body means and said workpiece, and means for retaining said spherical work engageable members in said grooves for movement therein in engagement with said grooves and said workpiece said spherical member retaining means being resiliently mounted on said body means for limited axial movement independent of the interfitting movement of the workpiece as it is placed on the arbor to permit ease of loading.

2. A high precision arbor for workpieces having an arbor engageable surface comprising body means having a longitudinal axis adapted to be aligned with the longitudinal axis of the arbor engageable surface of the workpiece, a plurality of spaced parallel grooves formed in said body parallel with the longitudinal axis of said body means, each of said grooves having side walls spaced apart a predetermined distance, a plurality of spherical work engageable members each having a diameter greater than said predetermined distance having at least portions thereof disposed in said grooves for movement only in direction parallel with the axis of said body means and said workpiece, annular retaining collar means formed with a plurality of radial apertures corresponding to the number of spherical members and having an annular size intermediate the annular size of said body means and the arbor engageable surface of said workpiece, said apertures in said collar having a size permitting portions of said spherical members to project therethrough for contact with said workpiece while retaining same in said grooves, said collar means being resiliently mounted on said body means for limited axial movement independent of the interfitting movement of the workpiece as it is placed on the arbor to permit ease of loading.

3. The arbor set forth in claim 2, wherein said collar is biased in a first axial direction and is movable against said bias in the other axial direction upon the placing of a workpiece in assembled relation on said arbor.

4. The arbor set forth in claim 3, wherein the arbor body means is generally cylindrical and has an entering end, said entering end having at least portions thereof of a radial size larger than said radial size of said annular collar to provide a stop means for arresting movement of said collar in said first axial direction.

5. The arbor set forth in claim 4 wherein the arbor is a male arbor, the entering end of the body means portion having a radial size larger than the grooved portion of the body and being beveled to afford ease of entry to the I.D. of a cylindrical surface of a workpiece.

6. The arbor set forth in claim 5 wherein the grooves adjacent the entering end of the body means have the side walls thereof spaced apart a dimension greater than said predetermined dimension whereby the spherical members having a portion located in said wider grooves are spaced radially closer to the axis of said body means than the spherical members located in the remainder of the grooves to afford easier entry of the arbor to the workpiece cylindrical surface.

7. The arbor set forth in claim 4 wherein the arbor is a female arbor, the entering end of the body means portion having a radial size smaller than the radial size of said grooved body means portion.

8. A high precision arbor for workpieces having a cylindrical surface comprising body means having a longitudinal axis adapted to be aligned with the longitudinal axis of the cylindrical surface of the workpiece, a plurality of spaced parallel grooves formed in said body means parallel with the longitudinal axis of said body means, each of said grooves being generally V-shaped having inclined side walls spaced apart a predetermined distance at the outboard edges relative to said body means, and having an included angle $\phi$ which is less than the locking angle for V-shaped grooves, a plurality of spherical work engageable members each having portions thereof disposed in said grooves for rolling movement on the inclined side walls of the groove, the contacting of the spherical members with the side walls of the grooves being at an angle greater than the locking angle, said movement of said spherical members being only in direction parallel with the axis of said body means and said workpiece, and means for retaining said spherical work engageable members in said grooves for movement therein in engagement with said grooves and said workpiece, said spherical work engageable members and body means being made of a deformable material whereby the spherical members located on the outboard edges of said grooves are adapted to deform slightly out of round upon engagement with the workpiece cylindrical surface and cause a slight deformation in the side walls of the grooves to shift the contact points of the spherical members with the respective side walls toward the inboard edges of the grooves.

9. A high precision arbor for workpieces having an arbor engageable surface comprising body means having a longitudinal axis adapted to be aligned with the longitudinal axis of the arbor engageable surface of the workpiece, a plurality of spaced parallel grooves formed in said body means parallel with the longitudinal axis of said body, each of said grooves being generally V-shaped having inclined side walls, a plurality of spherical work engageable members each having a diameter of sufficient size so that portions thereof disposed in said grooves engage each side wall of the groove for rolling movement thereon and a portion of said spherical members projects beyond the confines of said grooves for contact with said workpiece arbor engageable surface, said movement of said spherical members being only in direction parallel with the axis of said body and said workpiece, said spherical members upon engagement with the workpiece being adapted to deform out of round and simultaneously to deform the side walls of the grooves, both said deformations being within the elastic limits of the materials of the body means and the spherical members, and means for retaining said spherical work engageable members in said grooves for movement therein in engagement with said grooves and said workpiece.

10. A high precision arbor for interference fit with workpieces having an arbor engageable surface having at least one predetermined diametrical dimension, comprising body means having a longitudinal axis adapted to be aligned with the longitudinal axis of the arbor engageable surface of the workpiece, a plurality of spaced parallel grooves formed in said body means parallel with the longitudinal axis of said body means, each of said grooves being generally V-shaped having inclined side walls, at least two grooves being diametrically opposed on opposite sides of said body means, a plurality of spherical work engageable members each having a diameter of sufficient size so that portions thereof disposed in said grooves eagage each side wall of the groove for rolling movement thereon and a portion of said spherical members projects beyond the confiines of said grooves for contact with said workpiece arbor engageable surface, means for retaining said spherical members in said grooves and biasing same in a first predetermined direction along the axis of said body means, said spherical members in said two grooves providing an arbor diameter initially larger than said predetermined diametrical dimension, said movement of said spherical members being only in direction parallel with the axis of said body and said workpiece, said spherical members in said two grooves upon engagement with the arbor engageable surface of said workpiece of predetermined diametrical dimension being adapted to deform out of round and simultaneously to deform the side walls of the grooves, both said deformations being within the elastic limits of the materials of the body means and the spherical members, whereby an interfering fit of arbor and workpiece are obtainable and the arbor will revert to its initial larger diameter upon disassembly of the arbor and workpiece.

11. A high precision arbor for workpieces having a cylindrical surface comprising body means having a longitudinal axis adapted to be aligned with the longitudinal axis of the cylindrical surface of the workpiece, a plurality of spaced groove means formed in said body means parallel with the longitudinal axis of said body means, each of said groove means having inclined side walls spaced apart a predetermined distance at the outboard edges relative to said body means, said side walls of the groove means being spaced apart a lesser distance than said predetermined distance at the inboard edges thereof relative to said body means, and a plurality of spherical work engageable means each being provided with a diameter slightly greater than said predetermined distance having portions thereof disposed in said groove means for rolling movement in a direction parallel with the axis of said body means and said workpiece on the side walls of the groove means at the outboard edges, and for deforming the side walls of the groove means when the spherical work engageable means are deformed slightly out of round upon engagement with the workpiece cylindrical surface whereby to shift the contact points of the spherical work engageable means with the respective side walls toward the inboard edges of the groove means, and means for retaining said spherical work engageable means in said groove means for movement therein in engagement with said groove means and said workpiece.

12. A high precision arbor for workpieces having a cylindrical surface comprising body means having a longitudinal axis adapted to be aligned with the longitudinal axis of the cylindrical surface of the workpiece, a plurality of spaced parallel grooves formed in said body means parallel with the longitudinal axis of said body means, each of said grooves being generally V-shaped having inclined side walls spaced apart a predetermined distance at the outboard edges relative to said body means, and having an included angle which is less than the locking angle for V-shaped grooves, a plurality of spherical work engageable members each having portions thereof disposed in said grooves for rolling movement in a direction parallel with the axis of said body means and said workpiece on the side walls of the grooves at the outboard edges, said spherical work engageable members having an outer surface for accommodating the cylindrical surface of the workpiece whereby the rolling radius of said workpiece on the spherical work engageable members at said side wall outboard edges is greater than the rolling radius of the spherical work engageable members on the body means to permit the workpiece to travel relative to the arbor a greater distance than the travel of the spherical work engageable members relative to the grooves, and means for retaining said spherical work engageable members in said grooves for movement therein in engagement with said grooves and said workpiece.

References Cited in the file of this patent

UNITED STATES PATENTS

| | | |
|---|---|---|
| 846,079 | Yost | Mar. 5, 1907 |
| 1,270,533 | Lombard | June 25, 1918 |
| 1,787,932 | Breitenstein | Jan. 6, 1931 |
| 1,922,151 | Boice | Aug. 15, 1933 |
| 2,225,929 | Sarazin | Dec. 24, 1940 |
| 2,348,611 | Davidson | May 9, 1944 |
| 2,854,238 | Kennell | Sept. 30, 1958 |